Oct. 31, 1967 W. P. LEAR 3,350,028

SPOOL CONSTRUCTION FOR MAGNETIC TAPE

Filed Aug. 31, 1964

2 Sheets-Sheet 1

INVENTOR
WILLIAM P. LEAR,
By Richard A. Marsen
his ATTORNEY

Oct. 31, 1967 W. P. LEAR 3,350,028

SPOOL CONSTRUCTION FOR MAGNETIC TAPE

Filed Aug. 31, 1964

2 Sheets-Sheet 2

INVENTOR
WILLIAM P. LEAR,
By Richard A. Morse
his ATTORNEY

United States Patent Office 3,350,028
Patented Oct. 31, 1967

3,350,028
SPOOL CONSTRUCTION FOR MAGNETIC TAPE
William P. Lear, Wichita, Kans., assignor to Lear Jet Industries, Inc., a corporation of Delaware
Filed Aug. 31, 1964, Ser. No. 393,326
2 Claims. (Cl. 242—71.8)

This invention relates to novel spool constructions for reels of magnetic tape as used in cartridges.

The invention is particularly directed to mass-produced spools of maximum utility and ruggedness at minimum cost. The spool is made in two sections: one containing a disc-base for the tape reel; the other, the hub containing pins that snap into the core of the base section. The tape reel is thus readily contained into the spool, when fully wound, with a minimum of labor and components. This is a significant factor, when the production of millions of cartridges is involved per year. Also, direct accessibility or removal of the reel is feasible.

The spool base embodies a number of radial ridges that are flat and highly polished to provide minimal friction to the tape edges when in play operation. The outer edges of the ridges are tapered downwardly, towards the spool rim. An endless tape reel is thereby smoothly accommodated, without hitching thereat.

The above and further features, advantages and objects of the present invention will become more apparent from the following description of an exemplary embodiment thereof, illustrated in the drawings, in which.

Figure 1:
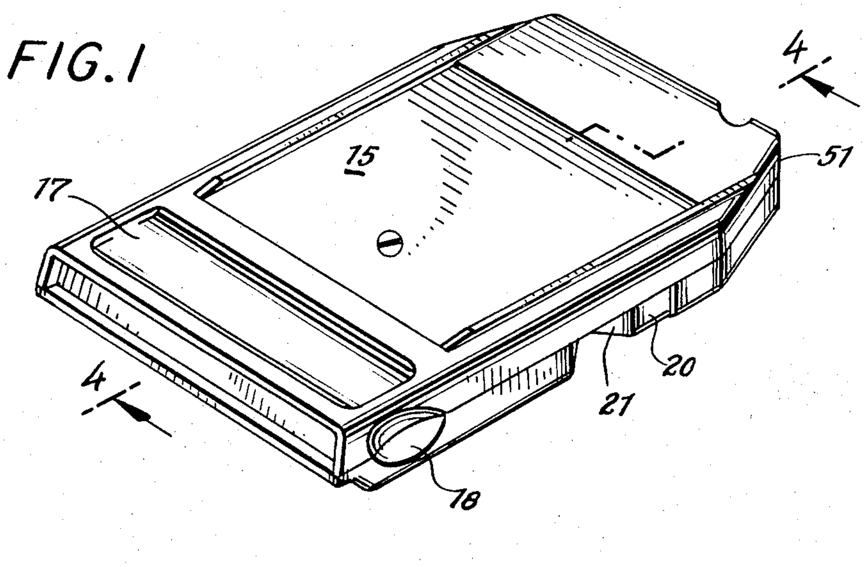
FIG. 1 is a perspective illustration of a magnetic tape cartridge containing the spool hereof.

The magnetic tape cartridge 15 contains a reel 16 of magnetic tape in endless array. A hand sized cartridge is feasible with ¼" tape, for two hours of stereophonic music at 3.75 inches per second travel and one-half hour track length. The cartridge 15 is inserted into a player unit for direct playing, as described in the copending patent application for Combination Radio and Magnetic Player, Ser. No. 392,212, filed on Aug. 26, 1964, and assigned to the same assignee. The cartridge 15 is readily gripped at finger grooves 17 on top, or 18 at each side, for insertion or removal from the player. The notches 20 and 21 on the cartridge side serve to hold it in the player at the "readiness" or "play" modes, as described in the aforesaid case. Further details of the cartridge 15 are described in my copending patent application, Magnetic Tape Cartridge, Ser. No. 393,083, filed on Aug. 31, 1964, and also assigned to the assignee hereof.

The spool base 25 is an integrally molded unit, as of styrene. It is composed of a central core 26 proportioned to receive the separable hub 27. The inner cylindrical portion 28 of the core fits over the post 30 within the cartridge, see FIG. 4. The lower part 31 of the cylinder 28 extends slightly beyond the spool base and rests on the cartridge base portion 32 across a ring washer 33, as of Teflon. The spool base 25 is thus rotatably supported in the cartridge 15, for smooth turning.

Figure 3:
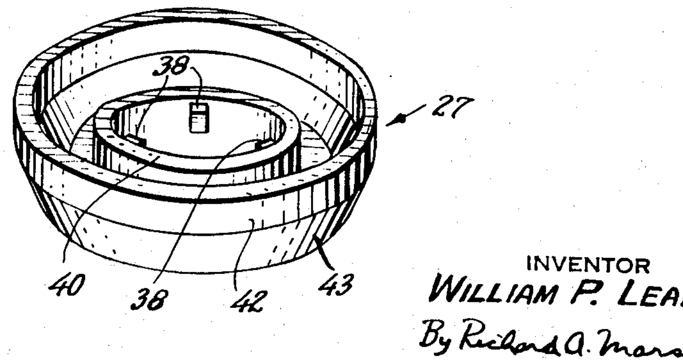
FIG. 3 is a perspective illustration of the snap-on spool hub.

The outer core portion 35 contains three pairs of radial fingers 36, 36, equi-spaced. These finger sets 36, 36 are integral with the hub, and molded-in at the spool formation. The fingers 36, 36 each contain a radial ridge 37 facing each other. The spacing across the ridge pairs 37, 37 is proportioned to closely fit with the pins 38, 38 projecting interiorly of the hub 27, see FIGS 3 and 4. The pins 38, 38 coact with the finger pairs 36, 36 across their ridges 37, 37 as a snap-fit.

Figures 5, 6:
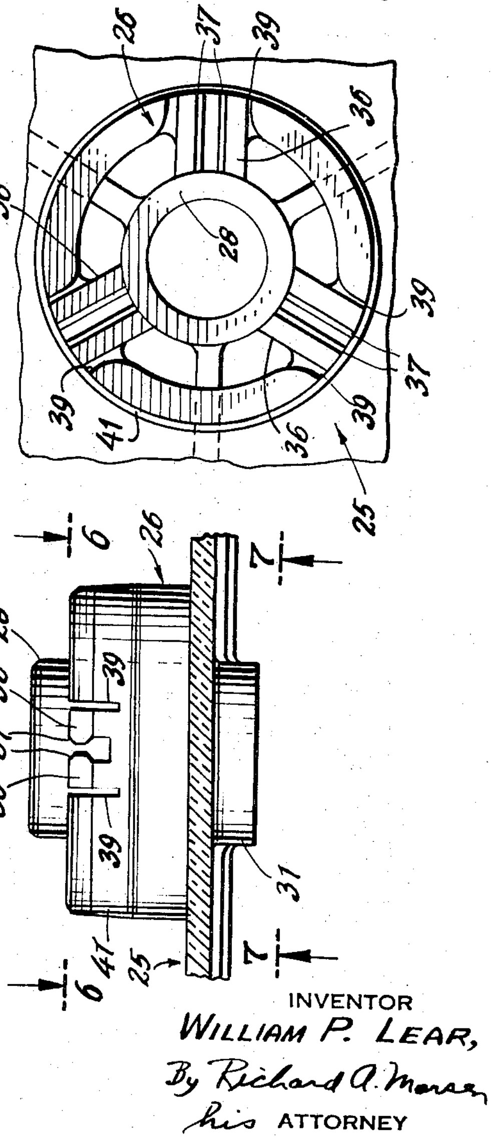
FIG. 5 is an elevational view of the spool core, as seen along the line 5—5 in FIG. 4, in the direction of the arrows.
FIG. 6 is a plan view of the spool core, taken along the line 6—6 of FIG. 5.

The elongated fingers 36, 36 have slits 39, 39 to impart controlled lateral flexibility to accommodate the pins 38, 38 into the snap-fit. The fingers 36, 36 and the pins 38, 38 are at 120° spacing, and the symmetrical hub 27 is mountable in any pin orientation. The projections or pins 38, 38 are integrally molded with the hub central cylindrical portion 40. The central hub cylinder 40 snugly fits about the outer rim 35 of the spool core 26. The upper section 41 of rim 35 is tapered so that the hub may readily slip over it (see FIG. 5).

The hub 27 is hollow, cup-shaped and of composition material, as styrene, to minimize its mass and rotational inertia. Its outer boundary is in substantially cylindrical form; its upper section 42 being vertical, its lower 43 slanting inwardly. The slanted face 43 of the hub 27 contacts the interior turn of the endless tape reel 16. The hub portion 43, at its tape-side face is made smooth, and preferably coated with a dry film lubricant, such as graphite spray.

The inner turn of the tape reel is payed out in an angular fashion through the opening 44 above it formed by a wafer 45. The smooth slanted face 43 of hub 27 initiates the tilted inner turn 16' of the reel 16 as the tape is motivated in its play mode. The overall tape path and movement in the cartridge 15 is shown and described in my copending patent application Ser. No. 393,083 referred to hereinabove. The wafer 45 fits in the cartridge just above the tape reel 16. It serves to firmly guide the inner turn outwardly during tape play.

A triangular ramp 46 on wafer 45 is a guide for the tape between the opening 44 and roller or post, not shown, about which the tape passes. Edge tapering on the wafer underside as at 47 facilitates smooth entry of the outer reel turns back onto the spool 25. A pinch roller 50 is supported near the front edge 51 of the cartridge 15, near a semi-circular cut-out 52. The tape is passed about the roller 50 at the cut-out region 52, against which the capstan presses, to move the tape. The endless tape configuration permits several hours of uninterrupted play with a plurality of parallel tracks recorded thereon.

The pinch roller 50 is mounted on a vertical rod 53 which is part of a wire spring biased to maintain a continuous pressure by the roller outwardly on the capstan, with the tape therebetween. The roller is composed of an outer rubber tire, or cylinder 54 mounted about a hub 55. Hub 55 is preferably of self-lubricating composition material and contains an axial bore fitted on the rod 53. The spool base has projections 56, 56 closely spaced, all around its rim. These projections are rounded, and are adapted to coact with a wire tip to latch the spool and contained reel when not in play operation. This feature is described in my aforesaid case Ser. No. 393,083. The low inertial construction hereof of the spool and hub 25, 26, 27 contributes to the effective and prompt braking and latching of the spool. This is important to prevent snarling of the tape.

The spool base 25 is of disc form, with a central circular platform 57 upon which the hub 27 rests. There are six integral radial equi-spaced ribs or ridges 58, 58 that radiate from platform 57 to the rim region of the base. The spool web portions 59, 59 between the ridges 58, 58 are undercut so as not to contact the tape edges, and strengthen the disc array. The tape reel 16 is supported on the radial ridges 58, 58. The surface of the ridges 58, 58 are flat and are highly polished with no irregularities.

Figure 2:
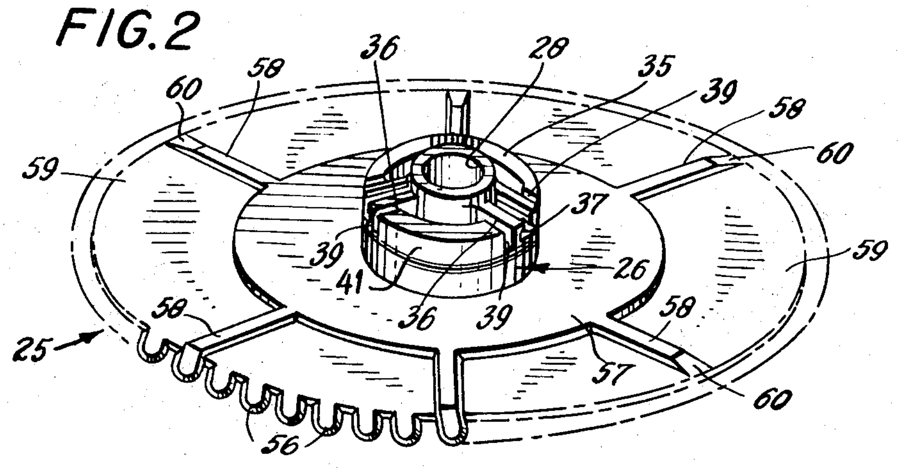
FIG. 2 is a perspective illustration of the exemplary spool base.
Figure 4:
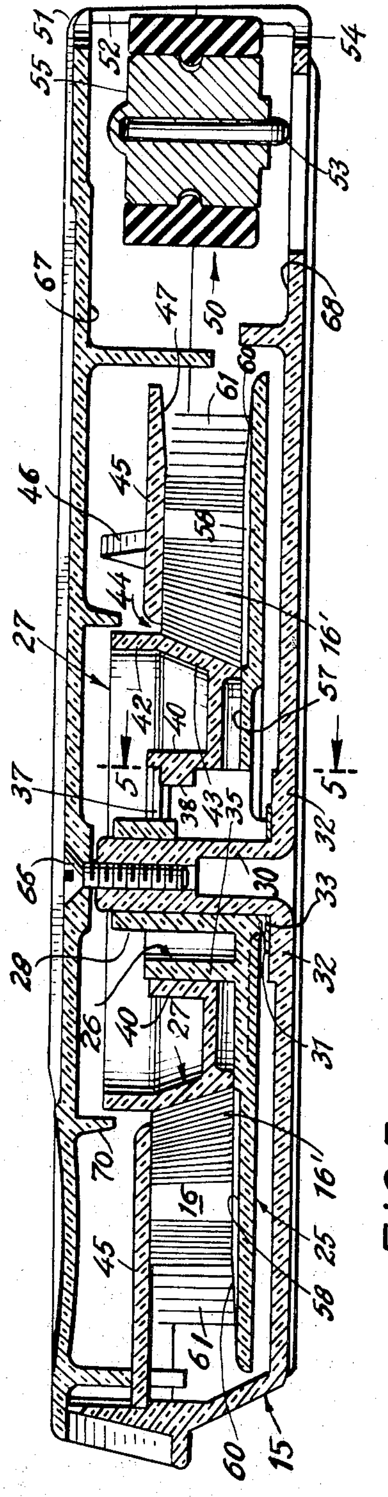
FIG. 4 is a cross-sectional view through the cartridge of FIG. 1, taken along the line 4—4 thereof.
Figure 7:
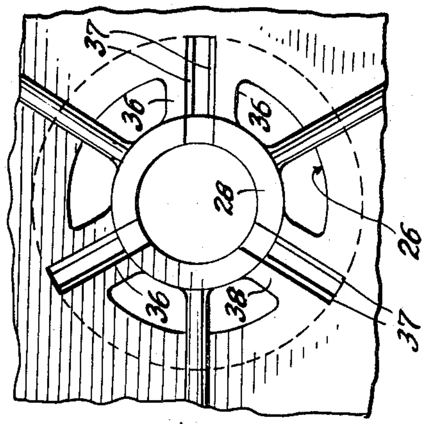
FIG. 7 is a bottom view of the spool core as seen along the line 7—7 of FIG. 5.

The ridge ends 60, 60 taper downwardly, as shown in FIGS. 2 and 4. This guides the tape to smoothly enter onto the spool base 25 without snag or hitch, and importantly to spread out outer turns 61.

The cover 67 is secured to the cartridge base 68 by their conforming fit together, and screw 66 at central post 30. An annular rim 70 in cover 67 is closely concentric about the hub top rim 42. This prevents possible spillover of the tape when payed out of the reel onto the hub, and thus maintains the tape loop.

Although the present invention has been described in connection with an exemplary embodiment thereof, it is to be understood that modifications and variations may be made therein without departing from the broader spirit and scope of the invention, as set forth in the following claims.

I claim:

1. A spool for operatively supporting a reel of magnetic tape of endless array in a cartridge comprising a base of substantially disc form with a central core projecting at one side thereof, said core being of cylindrical shape and containing a plurality of grip means spaced along its outer face, and a hub adapted to be fitted about said core and about which the reel is positioned, said hub having a plurality of pins projecting from its interior region individually engageable and disengageable with said grip means, each of said grip means being integrally formed in said core with respective pairs of elements constituting fingers that are spaced apart to form a gap which is normally less than the width of said pins and normally biased toward each other, whereby insertion of said hub about said core seats said pins between respective biased fingers of said pairs, to firmly grip said hub in operative relation on the spool.

2. A spool as claimed in claim 1, in which said fingers are pairs of radial arms arranged to grip the respective pins at their outer radial location on said core.

References Cited

UNITED STATES PATENTS

| | | | |
|---|---|---|---|
| 2,778,880 | 1/1957 | Eash | 242—55.19 X |
| 2,837,332 | 6/1958 | Busch | 242—55.19 |
| 2,880,993 | 4/1959 | Harries et al. | 242—55.19 |
| 3,126,163 | 3/1964 | Knox | 242—55.19 |
| 3,161,362 | 12/1964 | Smith | 242—55.19 |

FRANK J. COHEN, *Primary Examiner.*

B. S. TAYLOR, *Examiner.*